March 3, 1942.　　W. H. R. MILDEBRATH　　2,274,990
HAND BRAKE SIGNAL
Filed May 22, 1941　　2 Sheets-Sheet 1

Inventor
Willy H. R. Mildebrath
By Clarence A. O'Brien
Attorney

March 3, 1942.  W. H. R. MILDEBRATH  2,274,990
HAND BRAKE SIGNAL
Filed May 22, 1941  2 Sheets-Sheet 2
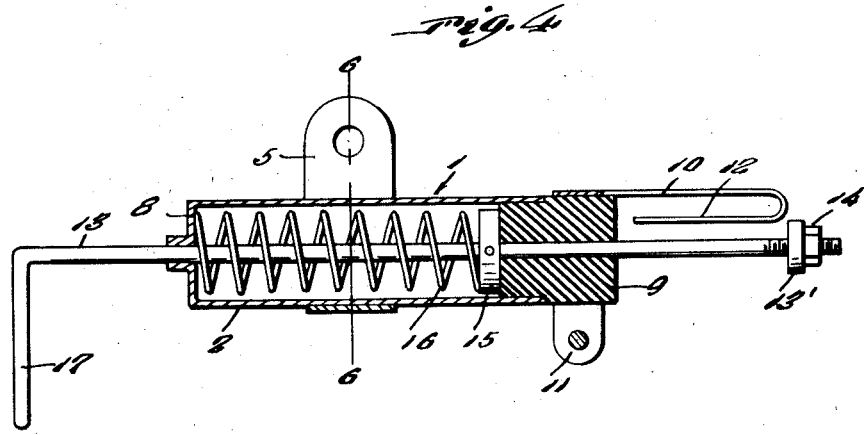
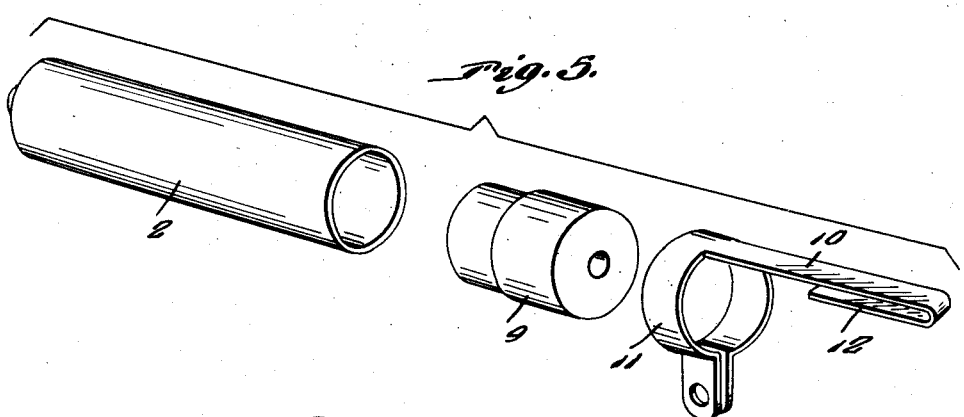
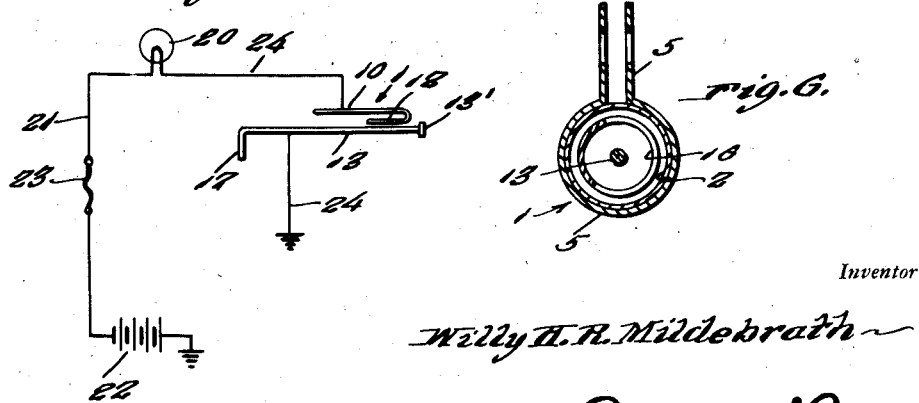
Inventor
Willy H. R. Mildebrath
By Clarence A. O'Brien
Attorney Patented Mar. 3, 1942

2,274,990

UNITED STATES PATENT OFFICE 2,274,990

HAND BRAKE SIGNAL

Willy H. R. Mildebrath, Jacksonville, Fla.

Application May 22, 1941, Serial No. 394,728

1 Claim. (Cl. 200—59)

The present invention relates to new and useful improvements in hand brake signals for motor vehicles and has for its primary object to provide, in a manner as hereinafter set forth, novel means for automatically and clearly indicating to the operator and others when the hand brake is fully or partially applied.

Another very important object of the invention is to provide a signal of the aforementioned character comprising a control switch of a novel construction and arrangement which is operable by the hand brake lever.

Other objects of the invention are to provide an automatic hand brake signal of the character described which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a view in vertical longitudinal section through the switch.

Figure 5 is an exploded perspective view of the cylindrical switch casing, the insulating plug mounted in one end thereof and the resilient contact arm mounted on the latter.

Figure 6 is a cross-sectional view through the switch, taken substantially on the line 6—6 of Figure 4.

Figure 7 is a diagrammatic view of the electric circuit.

Figure 1:
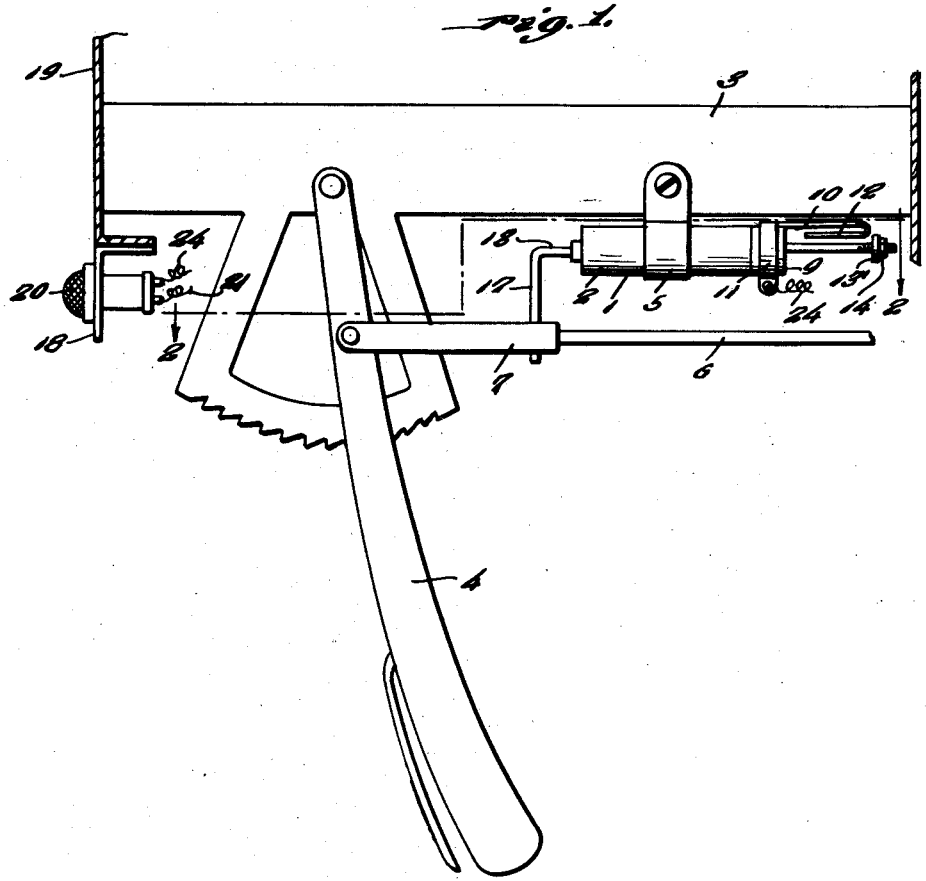
Figure 1 is a view in side elevation of a hand brake signal constructed in accordance with the present invention, showing the device installed.
Figure 2:
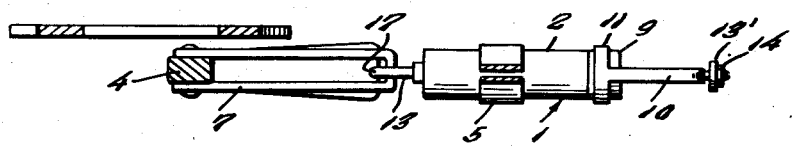
Figure 2 is a view in horizontal section, taken substantially on the line 2—2 of Figure 1.
Figure 3:
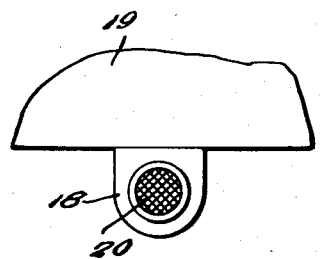
Figure 3 is a detail view in front elevation of the signal light.

Referring now to the drawings in detail, it will be seen that the embodiment of the invention which has been illustrated comprises a control switch which is designated generally by reference numeral 1. The switch 1 includes a cylindrical casing 2 of suitable conducting material, which casing may be of any desired length and diameter. The casing 2 is firmly secured in position beneath the usual support 3 of the hand brake lever 4 through the medium of a split metallic clamp 5. In Figure 1 of the drawings, reference numeral 6 designates a conventional brake operating rod having one end pivotally connected to the lever 4 through the medium of a yoke or the like 7. It will be observed that the casing 2 is positioned above the rod 6 adjacent to the lever 4.

The casing 2 comprises a closed apertured end 8. The other end of the casing 2 has mounted therein and protruding therefrom a plug 9 of suitable insulating material.

A resilient contact arm 10 is provided, on one end, with an integral, split clamp 11 through the medium of which said contact arm is firmly secured in position on the protruding portion of the insulating plug 9. The outer end portion of the arm 10 is bent upon itself in a manner to provide a resilient contact 12.

Extending slidably through the casing 2, the end wall 8 thereof and the plug 9 is a metallic rod 13. Threaded on one end portion of the rod 13 is an adjustable contact 13' which is engageable with the contact 12. A nut 14 secures the contact 13' in adjusted position.

Fixed on the rod 13 within the casing 2 is a collar 15 which is adapted to abut the plug 9. A coil spring 16 encircles the rod 13 in the casing 2 and is engaged with the collar 15 for actuating said rod 13 in a direction to disengage the contact 13' from the contact 12. At its other end, the rod 13 terminates in a depending arm or hook 17 which is engaged in the yoke 7 for connecting the control switch 1 to the hand brake lever 4 for actuation to closed position thereby when the hand brake of the vehicle is fully or partially set.

Mounted on a bracket 18 beneath the instrument panel 19 of the vehicle is an electric signal light 20. This light comprises a lens which is preferably red although, of course, any other color may be used. Also, the signal light 20 may be mounted at any other suitable point.

One side of the signal light 20 is electrically connected, as at 21, to a suitable source of current such as the usual storage battery 22 of the vehicle. A fuse 23 is interposed in the circuit between the light 20 and the battery 22. A conductor 24 electrically connects the other side of the signal light 20 with the contact 10 of the switch 1. Then, the switch 1 is grounded, as at 25.

It is thought that the operation of the invention will be readily apparent from a consideration of the foregoing. Briefly, with the brake lever 4 in "off" position the control switch 1 is open, the contact 13' being spaced from the contact 12. When the lever 4 is swung toward applied position the rod 13 is actuated against the tension of the coil spring 16 for engaging the contact 13' with the contact 12 thereby closing the circuit and energizing the signal light 20. Thus, the fact that the hand brake of the vehicle is on or partially so will be clearly indicated.

It is believed that the many advantages of a hand brake signal constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

In a signal device of the class described, a switch comprising a cylindrical casing of conducting material, having one end closed and the other end open, a plug of insulating material closing said open end of the casing and protruding therefrom, a resilient arm of conducting material, a clamp formed on one end of the arm and encircling the protruding portion of the plug, said arm having its free end portion bent upon itself and providing a resilient contact, a slidable rod extending longitudinally through the casing, the closed end thereof and through the plug with a portion of the rod projecting from the plug, the end of said portion being threaded, a contact member on said threaded end for engaging the first-mentioned contact, a nut on the threaded end of the rod for holding the contact member in place, a spring encircling the rod and located in the casing and having one end bearing against the closed end of the casing, a collar on the rod engaged by the other end of the spring with the collar normally forced by the spring against the inner end of the plug and means for connecting the opposite end of the rod to the hand brake of a vehicle, whereby when the brake is moved to applied position the contact on the rod will engage the resilient contact.

WILLY H. R. MILDEBRATH.